No. 817,265. PATENTED APR. 10, 1906.
W. W. McKEE.
SPRING WHEEL.
APPLICATION FILED MAY 20, 1905.

Witnesses
Charles Hanimann
Katherine Foltmer

Warner W. McKee
Inventor
By his Attorney

UNITED STATES PATENT OFFICE.

WARNER W. McKEE, OF BELLEVILLE, NEW JERSEY.

SPRING-WHEEL.

No. 817,265.　　　Specification of Letters Patent.　　　Patented April 10, 1906.

Application filed May 20, 1905. Serial No. 261,330.

*To all whom it may concern:*

Be it known that I, WARNER W. McKEE, a citizen of the United States, residing at Belleville, in the county of Essex and State of New Jersey, have invented certain new and useful Improvements in Spring-Wheels, of which the following is a specification, reference being had therein to the accompanying drawings.

The invention relates generally to an improvement in vehicle-wheels, and particularly to the class known as "resilient" wheels wherein the rim or felly is yieldingly supported from the wheel-hub.

The main object of the invention is the production of resilient or yielding connections between the hub and rim constructed and arranged to interbrace during load compression, whereby to increase the normal rigidity at the point required and at the same time increase beyond normal the resilient effect of the connections.

The invention in its preferred embodiment of details will be described in the following specification, reference being had to the accompanying drawings, in which—

Figure 1:
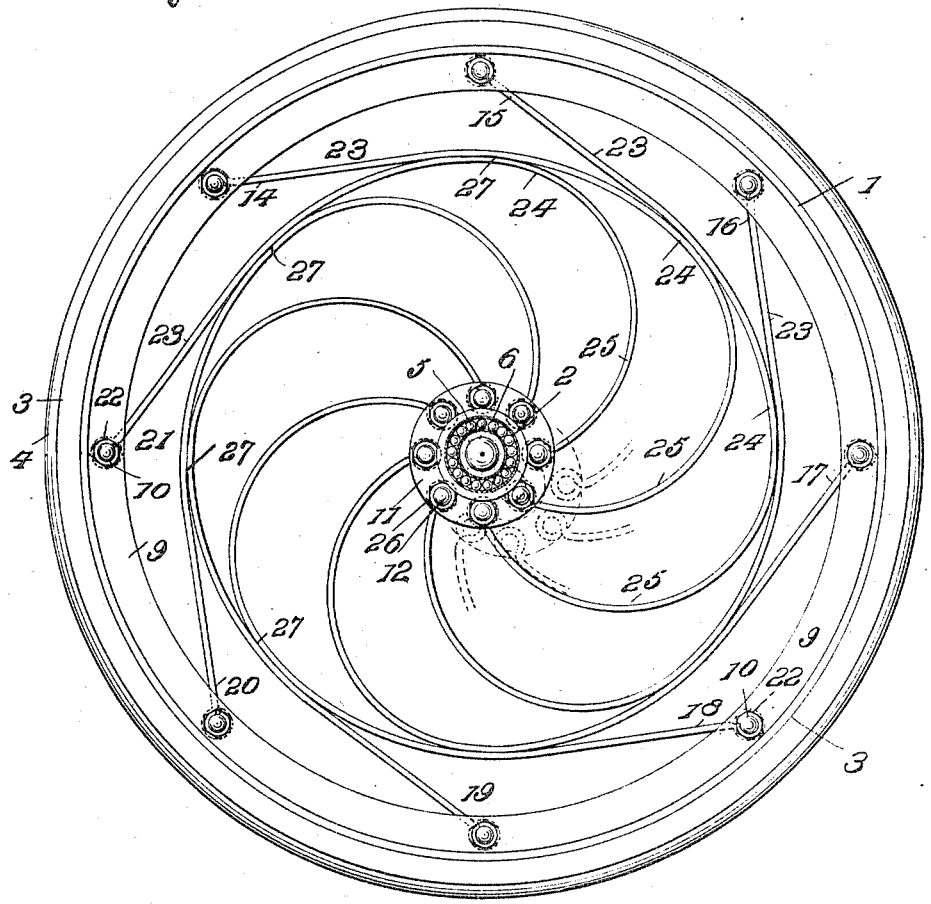
Figure 2:
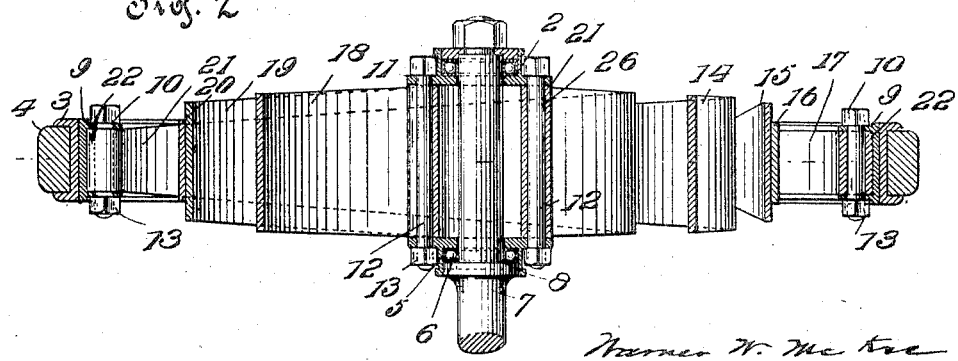

Figure 1 is a side elevation of a wheel constructed in accordance with my invention, the relative position of the parts during load compression being illustrated in dotted outline. Fig. 2 is a transverse central section of the same.

Referring to the drawings, my improved wheel comprises a rim 1 and hub 2, which aside from the details hereinafter described may be of the construction preferred, as they form no material part of the present invention. The wheel illustrated, however, is of the ball-bearing metallic style, the rim 1 having circumferential edge flanges 3 to receive a rubber tire 4 and the hub 2 having the usual cups 5 to contain balls 6 and centrally apertured to receive an axle 7, having ball-cones 8.

The rim 1 is formed or provided with inwardly-projecting annular flanges 9, preferably extending from the edges of the rim to provide an intermediate space for the reception of the outer ends of the connections or spring-spokes, to be later described. Bolts 10 are secured transversely to the flanges 9, spanning the space therebetween to receive one end of the spring-spokes, said bolts being equally spaced and in desired number around the rim. The hub 2 is also formed or provided with annular flanges 11, radially projecting from near the ends of the hub a sufficient distance to support transverse bolts 12, equally spaced apart circumferentially to the hub and of course similar in number to the bolts 10, said bolts 12 serving to receive the inner ends of the spring-spokes. By preference the bolts 10 and 12 are secured in place by the usual nuts 13 to provide for convenient separation and assembling of the parts when desired, though it is to be understood that said elements may, if desired, be in the form of rivets headed on opposite sides of the respective flanges.

The resilient connections between the rim and hub, hereinafter termed "spring-spokes," preferably comprise flat plates tapering in plan from the hub or inner end to the rim or outer end and of a thickness consistent with the contemplated use of the particular wheel. For convenience in description the spokes illustrated are numbered consecutively as 14, 15, 16, 17, 18, 19, 20, and 21, though it is to be understood that they are exact duplicates and that a detailed description of one will suffice for all.

Each spoke is formed at its rim or outer end with a coil 22 to receive a bolt 10 and of a length to fit between the flanges 9, then curved, as at 24, then bent into a curve of smaller radius than part 24, as at 25, and finally formed into a coil 26 of a width to fit between the hub-flanges 11 and designed to receive one of the bolts 12. In this connection it will be noted that the rim connection and hub connection of any particular spring are in alinement diametrically with respect to the wheel, so that the strain incident to load compression tends to advance or exert a pressure on the respective parts in the direction in which the vehicle is moving. The relative arrangement of the spring-spokes is such that a particular spoke is normally in contact with the next successive spoke, the contact being approximately between the part 24 and the junction of said portion and the portion 23 of said next successive spoke, as at 27. By this arrangement a contact is maintained normally between all the spokes of the wheel, and it is through this contact, coupled with the particular shape of the spokes, that the decided advantage of the present invention is gained. Under load compression the springs, which are located between the hub 2 and rim 1 in the lower forward quarter of the wheel—in the present instance, spokes 14, 15, and 16—are subjected to a downward and forward movement at their inner or hub ends, as shown in dotted lines, thus forcing these spokes toward the next successive spoke, increasing the contact and interbracing them, with the effect to materially increase the rigidity of the structure at this point. The movement of these spokes will elongate or separate the spokes at the upper portion of the wheel with the effect to relieve the contact between the spokes at this point and increase their resiliency.

It will thus be noted that in the wheel of my invention the spokes automatically accommodate themselves to the load conditions, rendering the wheel structure rigid where such is particularly desirable and increasing the resiliency of the rest of the structure.

Owing to the respective end connections of the spokes being in the diametric line of the wheel, the load compression tends to move the hub forward and downward—that is, eccentric to the rim—with the effect to change the center of gravity of the wheel from its usual line directly over the contact-point of the rim to a line forward of said point, and thereby facilitate the movement of the vehicle.

The connections between the spoke ends and the rim and hub owing to the coils approximately filling the space between the respective pairs of flanges are such as to insure perfect alinement of the wheel and absolutely prevent any independent lateral movement of the rim or hub.

Having thus described my invention, what I claim as new, and desire to secure by Letters Patent, is—

1. A wheel comprising a rim, a hub, and resilient curved connection between the rim and hub and directly connecting said rim and hub, said connections being in yielding contact with each other for a portion of their lengths.

2. A wheel comprising a rim, a hub, and curved spring-spokes joining the rim and hub, each of said spokes being in yielding contact with the next successive spoke.

3. A wheel comprising a rim, a hub, and spring-spokes joining the hub and rim, each of said spokes being in yielding contact with the next successive spoke and the respective terminal connections of said spokes being in alinement diametrically with respect to the wheel.

4. A wheel comprising a rim, a hub, and spring-spokes connecting the hub and rim, each of said spokes being in yielding contact with the next successive spoke and the end connections of said spokes being in alinement diametrically with respect to the wheel on opposite sides of the wheel-center.

5. A wheel comprising a rim, a hub, and spring-spokes connecting the rim and hub, each of said spokes having a variable curve intermediate between its rim and hub connection and the curved portion of one spoke being in yielding contact with the next succeeding spoke.

6. A wheel comprising a rim provided with inwardly-projecting flanges spaced apart, bolts secured in said flanges, a hub provided with outwardly-projecting flanges spaced apart, bolts joining the hub-flanges, and spring-spokes terminally coiled to engage said bolts, each of said spokes being in yielding contact with the next succeeding spoke.

In testimony whereof I affix my signature in presence of two witnesses.

WARNER W. McKEE.

Witnesses:
FRANK J. DAVIS,
P. C. OSCANYAN.